United States Patent [19]

Kimura

[11] Patent Number: 4,740,660
[45] Date of Patent: Apr. 26, 1988

[54] COORDINATE INPUT APPARATUS
[75] Inventor: Kiyoshi Kimura, Miyagi, Japan
[73] Assignee: Alps Electric Co., Ltd., Japan
[21] Appl. No.: 947,401
[22] Filed: Dec. 29, 1986
[30] Foreign Application Priority Data Feb. 10, 1986 [JP] Japan .................................. 61-25699

[51] Int. Cl.$^4$ ............................................. G08C 21/00
[52] U.S. Cl. ..................................................... 178/19
[58] Field of Search ................... 178/18, 19; 324/207, 324/208

[56] References Cited

U.S. PATENT DOCUMENTS

| | | | |
|---|---|---|---|
| 3,732,369 | 5/1973 | Cotter | 178/18 |
| 3,904,822 | 9/1975 | Kamm et al. | 178/19 |
| 4,054,746 | 10/1977 | Kamm | 178/19 |
| 4,582,955 | 4/1986 | Blesser | 178/19 |

Primary Examiner—Stafford D. Schreyer
Attorney, Agent, or Firm—Guy W. Shoup

[57] ABSTRACT

In a coordinate input apparatus, a compensation loop is installed to surround a main loop, each main loop is scanned thereby rough region where a coordinate indicating tool exists can be detected, compensation value stored in a first memory means is referred corresponding to the detected rough region and current value to be transmitted to the compensation loop is adjusted thereby shift of the polarity inversion position of the magnetic field intensity is suppressed and interpolation value in the rough region is calculated, and correction value stored in a second memory means is drawn for the interpolation value.

1 Claim, 10 Drawing Sheets

COORDINATE INPUT APPARATUS

BACKGROUND OF THE INVENTION

1. Field of the Invention

The present invention relates to a coordinate input apparatus wherein position indicated on an input plane can be read at high accuracy.

2. Description of the Prior Art

In the prior art, an example of the coordinate input apparatus wherein position indicated on an input plane can be read at high accuracy is constituted in that scanning signal of the same phase is transmitted simultaneously into at least two conductors among a plurality of conductors embedded in parallel on a tablet, signal produced by the scanning signal transmitted into the conductors is detected by a coordinate indicating tool, inversion of polarity of the detected signal is discriminated, signal level is detected before and after the polarity inversion, and position of pointing by the coordinate indicating tool is operated and detected based on position of discrimination of the polarity inversion and the signal level.

Figure 17:
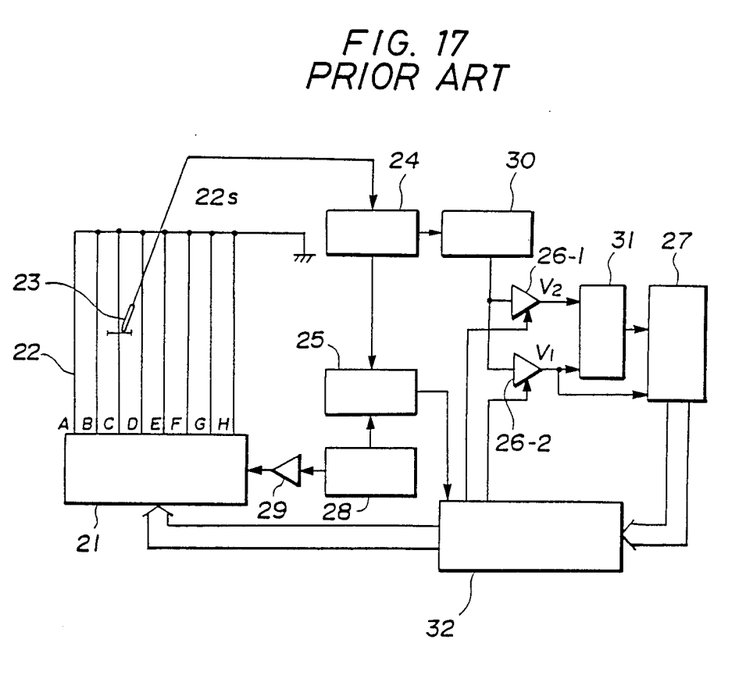
FIG. 17 is a basic constitution diagram of a coordinate input apparatus in the prior art.

FIG. 17 shows a basic constitution diagram of an example in the prior art, which will be described more specifically referring to FIG. 17. In FIG. 17, numeral 21 designates a switching circuit, numeral 22 conductors embedded in parallel on an input plane, numeral 23 a pickup for detecting in form of electric signal a magnetic field generated by high-frequency current flowing through the conductors, numeral 24 an amplifier, numeral 25 a polarity discrimination circuit for discriminating inversion of polarity of the signal detected by the pickup and amplified, numerals 26-1, 26-2 sample/hold circuits, numeral 27 an A/D converter, numeral 28 an oscillator for supplying high-frequency current to the conductors 22, numeral 29 a driver, numeral 30 a detection circuit, numeral 31 an adder, and numeral 32 a control device.

In FIG. 17, the coordinate input apparatus in the prior art performs at first step the rough detection of position of the pickup 23 regarding that it exists adjacent to which conductor 22. At second step, the coordinate input apparatus performs the detection at high accuracy regarding that it exists at which position between the conductor 22 and an adjacent conductor for example. The detection will be hereinafter described in detail.

The rough detection at first step will be described. Required data is transmitted from the control device 32 into the switching circuit 21. Based on the informed data, the switching circuit 21 changes in sequence the high-frequency current generated by the oscillator 28 and the driver 29 so that two conductors selected from the conductors 22 in every other conductor such as A and C, B and D, C and E, D and F . . . are scanned in the same current. The magnetic field generated by the conductors 22 is detected in form of electric current by the pickup 23 and amplified by the amplifier 24. The amplified signal is supplied to the polarity discrimination circuit 25, and discrimination is performed regarding whether or not the polarity is inverted corresponding to any scanning position. If the polarity inversion is discriminated, this is informed to the control device 32. Thus it follows that the rough position of the pickup 23 is detected.

The detection of high accuracy at second step will be described. The control device 32 at receiving information of the polarity inversion supplies hold pulse to the sample/hold circuit 26-1. Signal $V_2$ amplified and detected through the amplifier 24 and the detection circuit 30 and then inputted is held and stored by the sample/hold circuit 26-1. The control device 32 produces information to the switching circuit 21, and returns the state by one step. The hold pulse is supplied to the sample/hold circuit 26-2. Signal $V_1$ amplified and detected through the amplifier 24 and the detection circuit 30 and then inputted is held and stored by the sample/hold circuit 26-2. The signals $V_1$ and $V_2$ stored in this manner are supplied to the adder 31, and the sum signal $(V_1+V_2)$ is calculated. The sum signal $(V_1+V_2)$ is supplied to reference voltage input terminal $V_{REF}$ of the A/D converter 27, and either of the signals $V_1$, $V_2$, for example, the signal $V_1$ is supplied to input terminal $V_{IN}$. Thereby following value is calculated.

$$X_i = \frac{V_1}{V_1 + V_2} \tag{1}$$

Value of denominator and value of numerator in formula (1) are inputted respectively to the reference voltage input terminal $V_{REF}$ and the input terminal $V_{IN}$ of the A/D converter 27, thereby the value of formula (1) can be calculated without using divider of high cost. Since the signal $V_1$ is normalized by value of the sum signal $(V_1+V_2)$ of denominator, the input coordinate value $X_i$ can be calculated always stably even if the detection voltage varies. The calculated input coordinate value $X_i$ is informed to the control device 32. The input coordinate value $Y_i$ is calculated in similar manner, and informed to the control device 32. Based on the input coordinate values $(X_i, Y_i)$, the position coordinates (X, Y) where the pickup on the input plane exists can be calculated and outputted.

In the calculation method of the prior art, the two conductors 22 are selected and the polarity inversion at intermediate point between the two conductors is assumed thereby the calculation is performed. However, the inversion position may be shifted from the intermediate point due to the magnetic field generated from the common conductor supplying current to each conductor 22, thereby the calculation error due to the shift becomes a problem. Consequently, in another constitution, the compensation loop is installed to surround the conductors 22 and elimination of the influence of the common conductor is intended. Also in this constitution, since the influence cannot be completely eliminated, interpolation considering the shift of the polarity inversion position is necessary. Particularly, in constitution that each one loop is selected in sequence and scanned, the shift becomes a problem in accuracy. This constitution will be described specifically.

Figure 9:
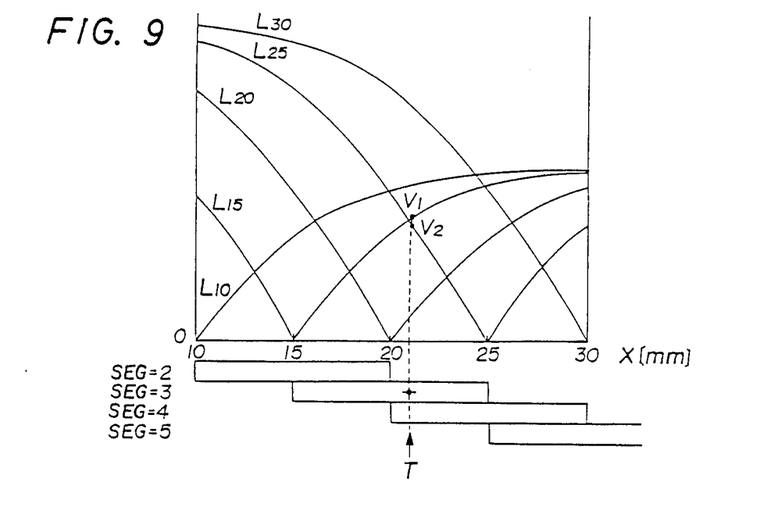
FIGS. 9 and 10 are diagrams illustrating detection principle of segment.

FIG. 9 shows a detection voltage distribution when there is no shift of the polarity inversion position. Here is shown an example of distribution of region of 10 mm $\leq X \leq 30$ mm, and each loop inverting at X = 10, 15, 20, 25, 30 mm is designated by $L_{10}$, $L_{15}$, $L_{20}$, $L_{25}$, $L_{30}$. Distribution of the magnetic field intensity $H_z$ corresponding to each loop $L_{10} \sim L_{30}$ becomes positive at the left side of the zero point and becomes negative at the right side thereof, and the voltage detects absolute value of the magnetic field intensity $H_z$. Regions of 10 mm $\leq X \leq 20$ mm, 15 mm $\leq X \leq 25$ mm, 20 mm $\leq X \leq 30$ mm are made rough regions and called segment 2 ($S_2$), segment 3 ($S_3$) and segment 4 ($S_4$), respectively.

Assuming that the pickup exists at T position (X=21 mm approximately) in FIG. 9, until when $S_4$, X=20 mm, $H_z<0$ (T position being to the right of the zero point in $L_{20}$ curve), and when $S_5$, X=25 mm, $H_z>0$. Consequently, the detection voltage $V_2$ due to the loop of $L_{25}$ is obtained. The forward segment by two, that is, loop $L_{15}$ of $S_{5-2}=S_3$, X=25−10=15 mm, is selected and the detection voltage $V_1$ due to this is obtained. In this example, segment $S_3$ corresponding to region of 15 mm≦X≦25 mm is selected as segment of interpolation.

Figure 10:
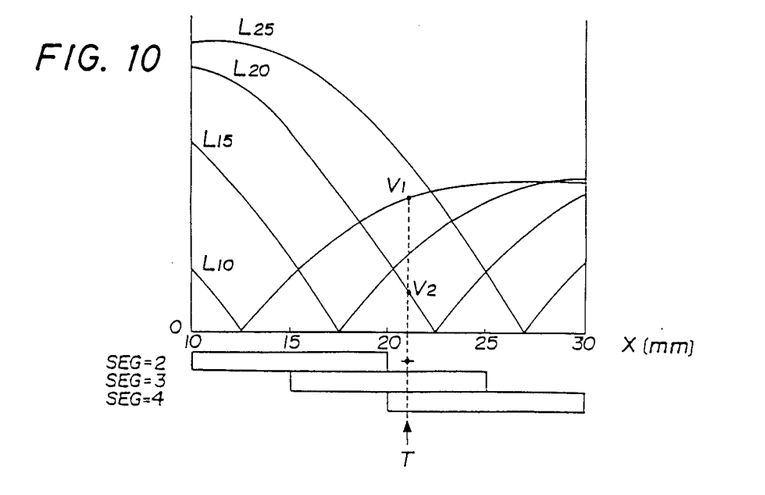

Next, an example at shifting of the polarity inversion position is shown in FIG. 10. In this example, distribution curve of the magnetic field intensity $H_z$ as above described is shifted to the positive direction of X, and like parts to the above loops and segments are designated by the same reference numerals. Also in this example, the pickup exists at T position adjacent to X=21 mm.

In this case, when $S_4$, X=20 mm, $H_z>0$ already. Consequently, the interpolation region becomes $S_{4-2}=S_2$, and the interpolation is performed at region of 10 mm≦X≦20 mm.

In other words, in spite of shifting out of the original segment region, the interpolation calculation is performed at the shifted region resulting in the error operation.

In this example of the prior art, since at least two conductors are selected and the scanning signal of the same phase must be transmitted into these conductors, the independent driver of constant current amplitude is required per each one conductor, and further two transistors, two registers, one decision register and one operation amplifier are required per one conductor, thereby the cost of circuits becomes high.

Furthermore, since a number of parts are used, control of variation in manufacturing of parts is difficult and adjustment after assembling the parts is troublesome.

Since a cheap decoder IC (output being always one line) cannot be used in the scanning, the apparatus must be constituted by a shift register. If the shift register is used, time is required before driving an aimed conductor resulting in another problem.

SUMMARY OF THE INVENTION

In view of above-mentioned problems in the prior art, an object of the invention is to provide a coordinate input apparatus wherein influence of a magnetic field from a conductor (source line) supplying current is eliminated to the utmost, position detection at higher accuracy is possible, and the cost is low and the operation time is short.

In order to solve the problems and attain the foregoing and other ovjects, the invention consists in a coordinate input apparatus wherein scanning signal is transmitted in sequence into a main loop composed of a plurality of conductors mutually embedded on an input plane, and coordinate position is detected based on signal detected by a coordinate indicating tool which can point on the input plane arbitrarily, comprising:

(1) a compensation loop installed near the common conductor of the main loop and constituted as a separate conductor;

(2) a switching means for selecting each one loop of the main loop in sequence and transmitting the scanning signal;

(3) a coordinate indicating tool for detecting signal produced by the scanning signal transmitted into each loop using the switching means;

(4) a polarity discrimination means for discriminating inversion of polarity of signal detected by the coordinate indicating tool;

(5) a first memory means for previously storing compensation value corresponding to rough coordinate position on the input plane of the coordinate indicating tool;

(6) a control means for detecting the rough coordinate position of the coordinate indicating tool from the scanning position where the polarity conversion is discriminated by the polarity discrimination means and invoking compensation value from the first memory means corresponding to the position thereof and transmitting current corresponding to the compensation value into the compensation loop;

(7) means for calculating interpolation value to interpolate the position pointed by the coordinate indicating tool from signal level before and after the polarity inversion of signal detected by the coordinate indicating tool;

(8) a second memory means for previously storing correction value to correct error between the interpolation value and the point position of the actual coordinate indicating tool; and (9) an operation means for calculating the point of the coordinate indicating tool from the coordinate position of the rough region and the correction value.

In the above means, intensity of the magnetic field generated by the source line supplying current to the main loop is adjusted by supplying current in reverse direction to the compensation loop, shift of the polarity inversion position in distribution of the magnetic field intensity $H_z$ is suppressed to zero or the minimum and the coordinate position is detected, and the detected coordinate position is further corrected thereby the accurate coordinate detection is performed. Its principle will now be described.

Figure 1:
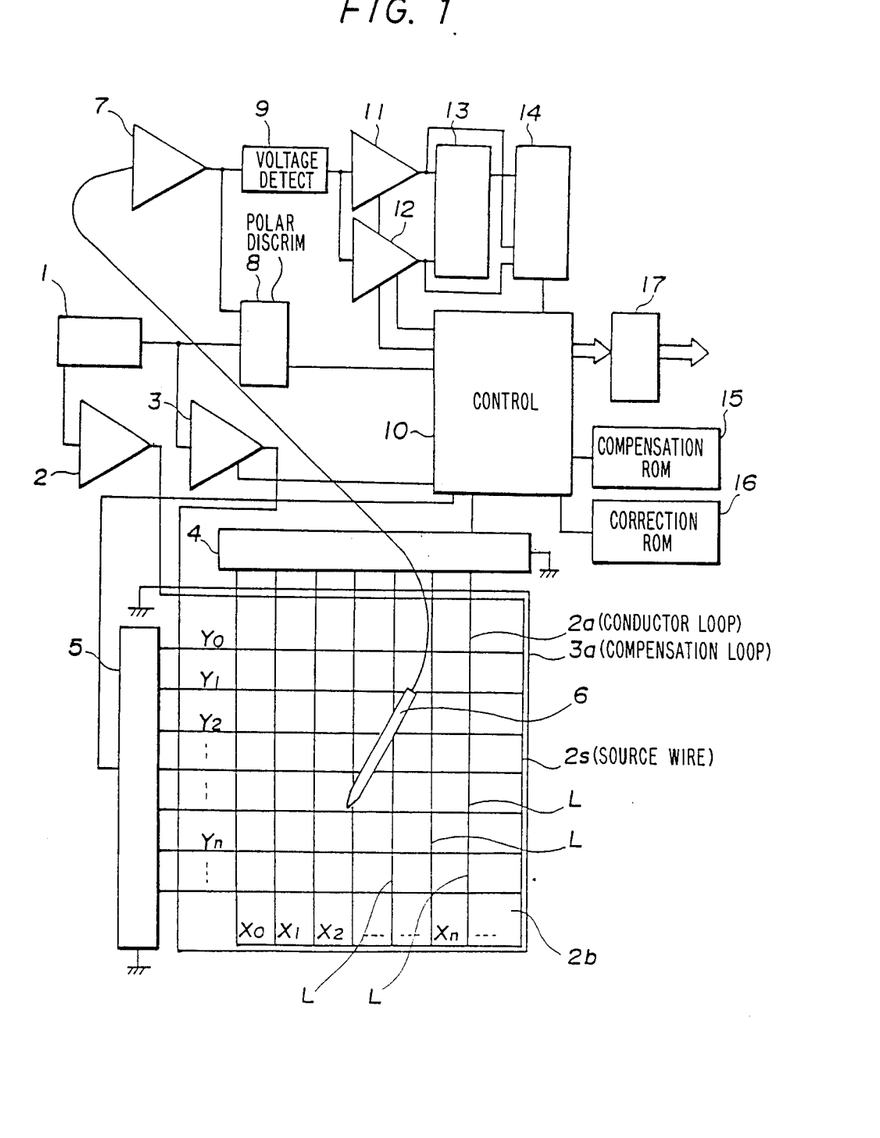
FIG. 1 is a basic constitution diagram of a coordinate input apparatus as an embodiment of the invention.
Figure 6:
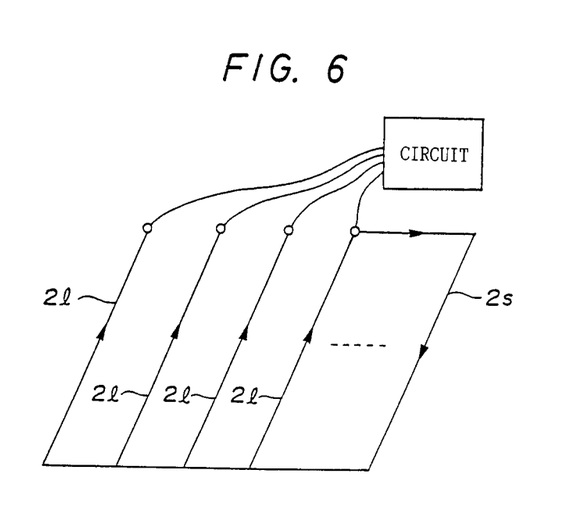
FIG. 6 is a diagram illustrating relation between source line and each main loop.

Since conventional calculation of distribution of the magnetic field intensity (Hz) is performed regarding a conductor which seems to be long to infinity, it is assumed that polarity of the magnetic field is inverted at the intermediate point of the two selected conductors (loop) 2l during the segment detection to detect the rough position. In the actual state, however, it has been found that the magnetic field generated from the source line 2s as shown in FIG. 6 takes part and the polarity inversion position is shifted remote from the source line 2s. Even when the conductor (loop) 2l most remote from the source line 2s is selected, the influence becomes large as the conductor approaches to the source line (common conductor) 2s in perpendicular direction to the conductor. Consequently, a compensation loop 3a as shown in FIG. 1 has been introduced. The compensation loop 3a is formed along the source line 2s of the main loop 2a so as to surround the main loop 2a, and current flows in reverse direction to the current flowing through the source line 2s.

Figure 7:
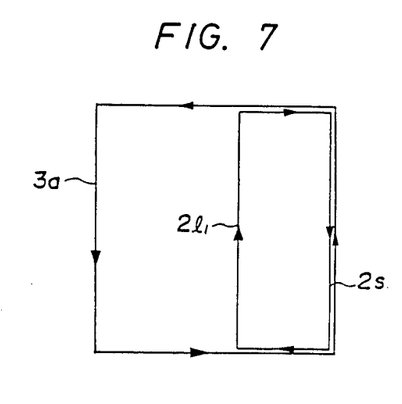
FIGS. 7 and 8 are diagrams illustrating relation between main loop and compensation loop.
Figure 8:
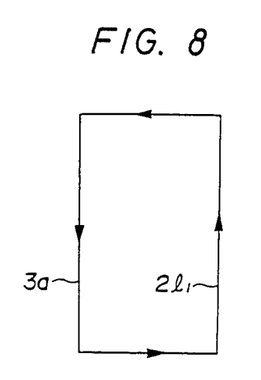

When one loop $2l_1$ as shown in FIG. 7 is selected as an example, assuming that value of current flowing in the compensation loop 3a is equal to current flowing through the source line 2s (shown by ← in the figure), the magnetic field is canceled by that generated by current in reverse direction thereby the magnetic field is not generated outward. Consequently, state shown in FIG. 7 becomes equivalent to state shown in FIG. 8. As a result, the polarity inversion position is shifted to the right in the figure. Consequently, if value of current flowing through the compensation loop 3a is suitably selected, the shift amount of the polarity inversion position can be made zero.

The current value (hereinafter referred to as "compensation current value") Ic is given by $$Ic = \frac{|Hz(x, y, Io)|}{|Hzc(x, y, Io)|}$$

Where Hz (x, y, Io) and Hzc (x, y, Io) represent intensity of the magnetic field at point (x, y) respectively produced from the main loop 2a and the compensation loop 3a when current flowing through the main loop 2a is Io. Ic represents current value (ratio) of the compensation loop 3a to the current Io flowing through the source line 2s in order that the composite value of the magnetic field intensity from both the main loop 2a and the compensation loop 3a becomes zero at the point (x, y).

The current value (ratio) Ic is previously calculated per prescribed region on the input plane, and the obtained compensation value Ic is stored as compensation value, for example, in the ROM (read only memory) table as memory means. According to the scanning of the main loop 2a, the compensation current value Ic corresponding to the prescribed region is invoked from the ROM table. Current value to be transmitted into the compensation loop 3a is determined corresponding to the current value transmitted into the main loop 2a, and the determined current is transmitted into the compensation loop 3a. Thereby, influence of the magnetic field generated by the source line 2s to transmit the scanning signal to the main loop 2a can be eliminated or adjusted. Since the polarity inversion position can be corrected to required position, the detection accuracy can be improved due to the position restriction.

However, when this method is applied to drive of only one loop, since linearity of the output voltage characteristics in detecting the magnetic field intensity cannot be secured, the interpolation value is not sufficient in accuracy. Consequently, correction value to correct the interpolation value will be introduced. That is, correction value to correct difference between the interpolation value and the measured position by the pickup is previously stored in the memory means such as ROM table, and the correction value corresponding to the interpolation value is invoked. Accurate position within the segment determined by the loop selected by the correction value is specified. Finally, the coordinate position of the segment and the position within the segment introduced by the correction value are combined thereby the accurate position on the input plane can be detected. According to the detection principle, the coordinate detection at good accuracy becomes possible even if each one loop is scanned.

DESCRIPTION OF THE PREFERRED EMBODIMENT

An embodiment of the invention will now be described referring to the accompanying drawings.

Figure 2:
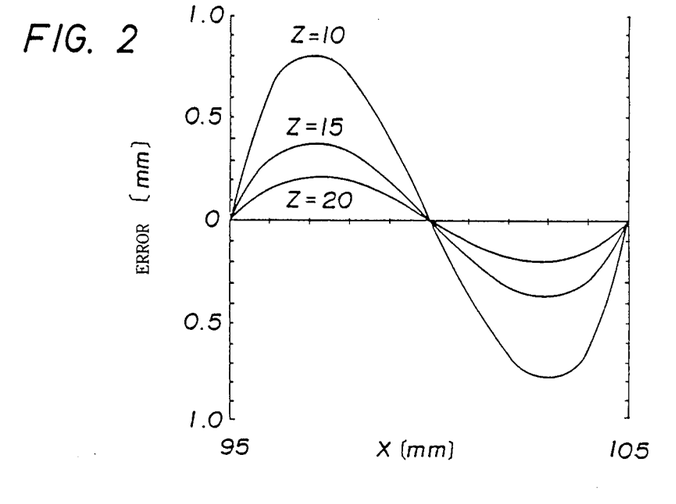
FIG. 2 is a measured graph illustrating relation between pickup level and error.
Figure 3:
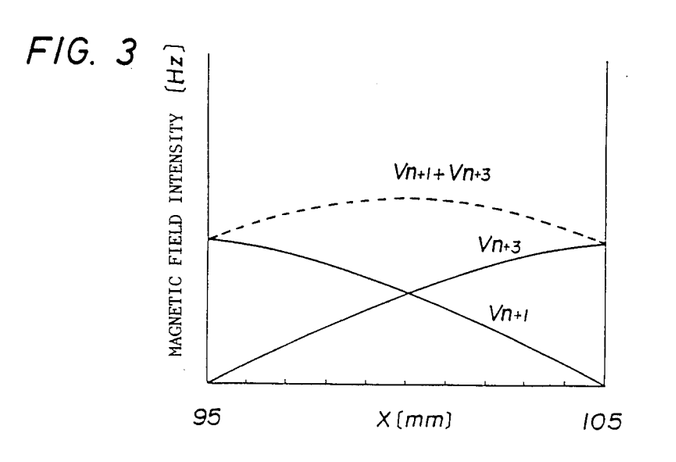
FIG. 3 is a graph illustrating magnetic field intensity distribution at fixed pickup level.
Figure 4:
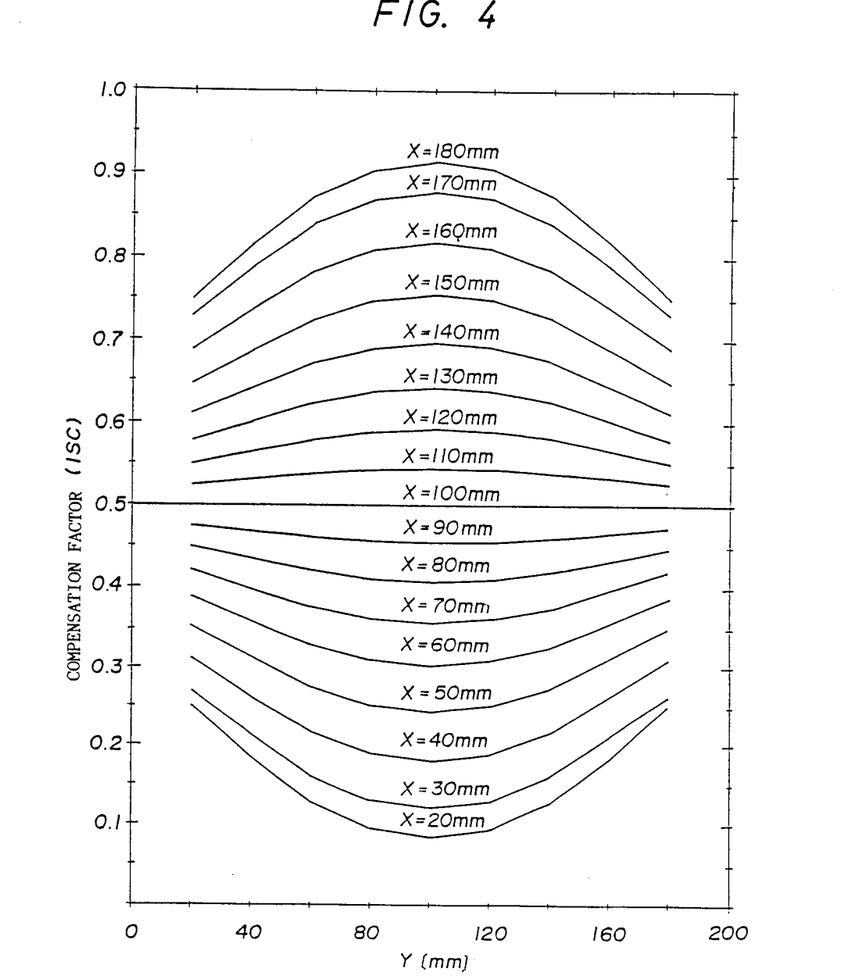
FIG. 4 is a graph illustrating distribution of compensation value between loop position and coordinate position in Y direction.
Figure 5:
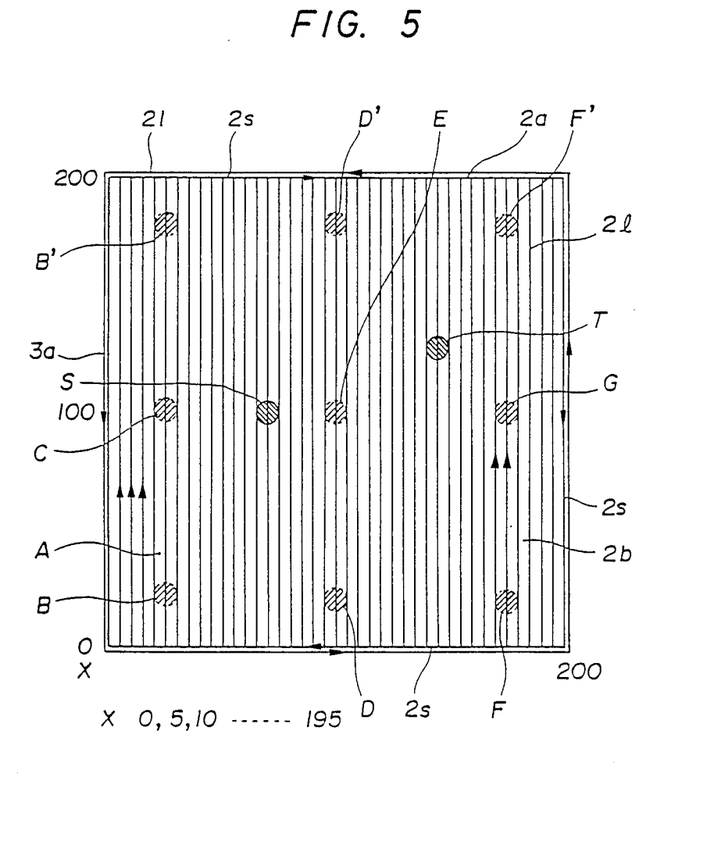
FIG. 5 is a schematic diagram illustrating an example of each loop in X direction and compensation loop.

FIGS. 1 through 5 illustrate an embodiment of the invention. FIG. 1 is a basic constitution diagram of a coordinate input apparatus; FIG. 2 is a graph illustrating relation between pickup level and error; FIG. 3 is a graph illustrating magnetic field intensity distribution at fixed pickup level; FIG. 4 is a graph illustrating relation between coordinate position in Y direction and compensation value; and FIG. 5 is a schematic diagram illustrating an example of each loop in X direction and compensation loop.

In FIG. 1, the coordinate input apparatus comprises a main loop 2a, an input plane 2b with a compensation loop 3a, a driver 2 transmitting current with definite amplitude to the main loop 2a through an oscillator 1, a driver 3 transmitting current to the compensation loop 3a, a pickup 6 as coordinate detecting tool with a magnetic field detecting coil, an amplifier 7 amplifying output detected by the pickup 6, a polarity discrimination circuit 8, a detection circuit 9, sample/hold amplifiers 11, 12, an adder 13, an A/D converter 14, a ROM table 15 as first memory means for storing compensation value, a ROM table 16 as second memory means for storing correction value of error of interpolation value, and a control circuit. A switching circuit 4 of the X direction is installed in loop of the X direction of the main loop 2a, and a switching circuit 5 of the Y direction is installed in loop of the Y direction.

The main loop 2a as shown in FIG. 5 is embedded on the input plane 2b in parallel arrangement with spacing 5 mm. One end of each loop L is connected to the switching circuit 4 (the switching circuit 5 in the case of the Y direction), and other end is connected to a source line 2s, so that the input plane of, for example, 200 mm × 200 mm is constituted as a whole. The source line 2s is connected to the driver 2. The Y direction is also constituted in similar manner and perpendicular to the X direction.

The compensation loop 3a is constituted in that a conductor being separate from the main loop 2a is embedded near the source line 2s of the main loop 2a so as to surround the main loop 2a as a whole. One end of compensation loop 3a is connected to the driver 3 to transmit current with prescribed amplitude to the compensation loop 3a in reverse direction to current flowing through the source line 2s of the main loop 2a, and other end of the compensation loop 3a is grounded.

Compensation value as shown in FIG. 4 for example is stored in the ROM table 15 as fixed memory means for storing compensation value corresponding to each loop L and region in the Y direction.

The ROM table 15 detects inversion position of polarity from the polarity discrimination circuit 8, and when the control circuit 10 detects rough region where the pickup 6 exists from the polarity conversion position the ROM table 15 invokes compensation value corresponding to the rough region. After the invoking, the control circuit 10 further transmits current corresponding to the invoked compensation value into the compensation loop 3a. The compensation value indicates ratio of current value transmitted into the main loop 2a. For example, in the loop of 70 mm in the X direction, if the pickup 6 exists in the region S of about 100 mm in the Y direction, the compensation value becomes 0.355 and the current value Io transmitted into the compensation loop becomes $Ic = 0.355\ Io$. Also in the loop of 140 mm in the X direction, if the region T of 120 mm in the Y direction is taken, the compensation value becomes 0.690 and the current value Ic becomes $Ic = 0.69\ Io$.

The ROM table 16 as second memory means for storing correction value corrects error from the calculated interpolation value and obtains the correct coordinate position. For example, it stores the correction value per 0.1 mm of the interpolation value for the detected segment.

TABLE 1

| Correction Value | |
| --- | --- |
| Interpolation Value (mm) | Correction Value (mm) |
| 0.00 | 0.00 |
| 0.10 | 0.07 |
| 0.20 | 0.14 |
| 0.30 | 0.21 |
| 0.40 | 0.29 |
| 0.50 | 0.36 |
| 0.60 | 0.44 |
| 0.70 | 0.52 |
| 0.80 | 0.59 |
| 0.90 | 0.67 |
| 1.00 | 0.75 |
| 1.10 | 0.84 |
| 1.20 | 0.92 |
| 1.30 | 1.00 |
| 1.40 | 1.09 |
| 1.50 | 1.17 |
| 1.60 | 1.26 |
| 1.70 | 1.35 |
| 1.80 | 1.44 |
| 1.90 | 1.53 |
| 2.00 | 1.63 |

An example of correction value is shown in Table 1. The correction value is an example from 0.00 mm to 2.00 mm in the segment of $X = 95$ mm and $X = 105$ mm under condition of $Y = 100$ mm and the detection level $Z = 15$ mm.

That is, according to Table 1, if the interpolation value is made 0.90 mm for example as a result of calculation, value of 0.67 mm shall be selected.

The pickup 6 is provided at front end portion with a magnetic field detecting coil, and voltage generated by the magnetic field detecting coil is transmitted through the amplifier 7 to the detection circuit 9 and the polarity discrimination circuit 8. Since the pickup detects the magnetic field during current passing through each loop L, the detecting becomes a problem in relation the error and the detecting intensity (magnetic field intensity). That is, as shown in FIG. 2, if the error at center portion of the input plane 2 is plotted using the pickup level Z as parameter, the error becomes 0.4 mm or less when $Z > 15$ mm, but vertical component of the magnetic field becomes weak at further remote portion.

Consequently, the level $Z = 15$ mm is selected as compromise point in the embodiment. This level corresponds to 1.5 times of the pitch of the loop used in the interpolation. If the interval of the loop is decreased, of course, Z is decreased.

Since other parts are all constituted in similar manner to the example in the prior art, the description regarding these parts shall be omitted.

Subsequently, operation of the coordinate input apparatus will be described.

Position detection of the pickup 6 is performed in broadly dividing it into three steps, i.e., detection of the segment being approximate position of the pickup 6, interpolation being detection of detailed position within the detected segment, and composition of the segment position and the detailed position within the segment. Only difference from the prior art will now be described in detail, but content similar thereto will be roughly described.

At the segment detection, the drivers 2, 3 are first operated using sinusoidal wave generated by the oscillator 1. In this state, current by the driver 2 flows in sequence through only one particular loop L among the switching circuits 4, 5 assigned by the control circuit 10. If the current flows through each loop L, the magnetic field generated regarding the loop L is detected by the pickup 6 and amplified by the amplifier 7 into signal with required amplitude. This signal is compared with output of the oscillator 1 regarding phase in the polarity discrimination (phase comparison) circuit 8. In other words, polarity of the magnetic field can be detected here. Assumed that output of the polarity discrimination circuit 8 is "H" when the loop L at the left side of the pickup 6 in the figure is driven. Since the polarity of the detected magnetic field is inverted when the loop L at the right side of the pickup 6 is driven, output of the polarity discrimination circuit 8 is inverted into "L". Consequently, the scanning position where the polarity is inverted during the scanning process can be detected.

If the polarity conversion is discriminated, this is informed to the control circuit 10 thereby rough position (segment) where the pickup 6 exists can be detected.

If the control device 12 detects the segment of the pickup 3, the compensation current value Ic corresponding to the segment to the ROM table 15 and the corresponding value is invoked from data of the compensation current Ic stored in the table 15. Current value to be transmitted into the compensation loop 3a is determined from the compensation current value Ic, and high-frequency current corresponding to the above-mentioned current value is transmitted through the oscillator 1 and the driver 3 to the compensation loop 3a. Thereby the polarity inversion position in the segment where the pickup 6 exists is corrected to come to a prescribed loop position as shown in FIG. 9 for example without shifting. The loop where the polarity inversion is detected and other loop before the above-mentioned loop by two are driven, and signals $V_1$, $V_2$ are detected and position of $X_i$ is calculated from formula (1) in similar manner to the prior art. Position in the Y direction can be also calculated in similar manner. The calculated value is interpolation value when the loop is assumed to be long to infinity. If the interpolation value is calculated, the proper correction value is invoked from the ROM table 16 as above described, and the invoked correction value and the minimum value of the segment are added so as to estimate the coordinate value.

That is, when the pickup 6 exists at T position shown by FIG. 10 for example, the coordinate inversion position exists between the loop $L_{15}$ and the loop $L_{20}$. Consequently, the compensation value corresponding to this region, i.e., $L_{10} \sim L_{20}$ is invoked from the ROM table 15, and the compensation current value Ic corresponding to the compensation value is transmitted into the compensation loop 3a. If the loop $L_{10}$ and the loop $L_{20}$ are driven, both loops become negative in polarity and it is understood that the polarity is not inverted between both loops $L_{10}$, $L_{20}$. If the loop $L_{25}$ being larger in number by one is driven again, inversion to positive polarity occurs and more accurately the pickup 6 exists between the loop $L_{20}$ and the loop $L_{25}$. Further the compensation current value Ic corresponding to position of the loop $L_{15}$ and the loop $L_{25}$ is transmitted into the compensation loop 3a and the detection is performed. In this case, the loop where the polarity is inverted for the first time and the loop before the previous loop by two are driven as above described, and voltages $V_1$, $V_2$ from both loops are detected and calculated. In this constitution, if the interpolation value of 7.00 mm is calculated for example, the correction value 6.15 mm corresponding to 7.00 mm is invoked from the ROM table 16 and then added to minimum value of the aimed segment (SEG=3), 15 mm in this case, thereby the coordinate value, X=21.15 mm is obtained.

Errors of the coordinate value detected in this manner will be studied.

Figure 11:
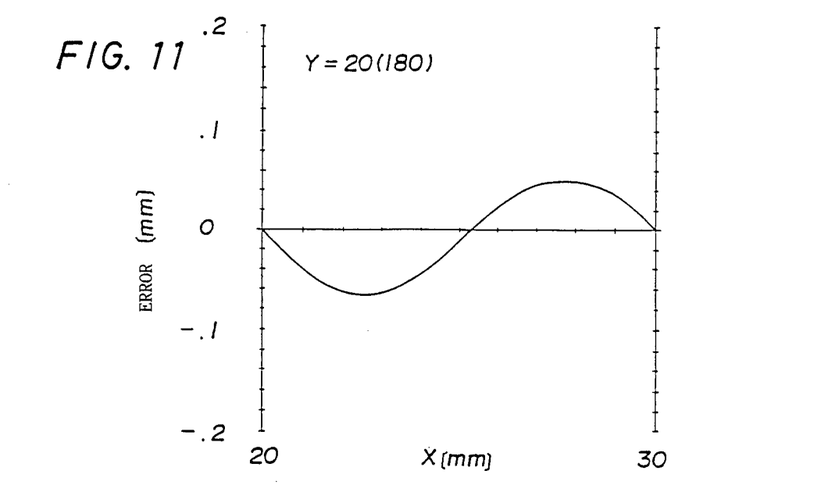
FIGS. 11 through 16 are measured graphs of detection error.
Figure 12:
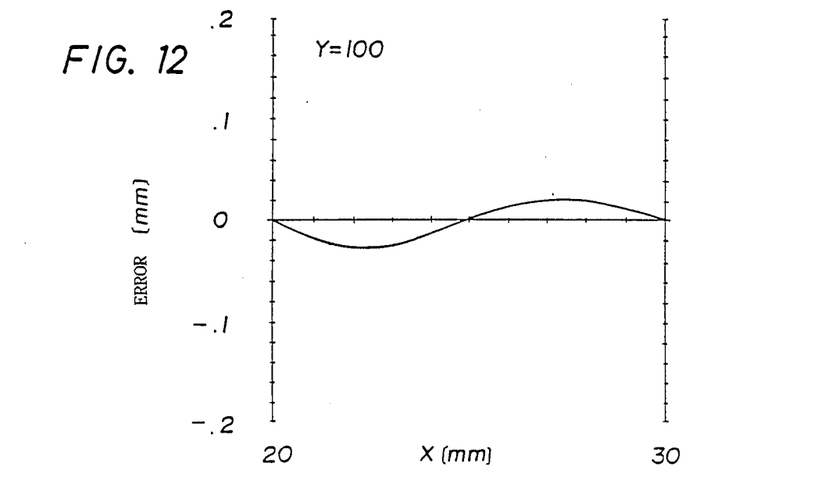
Figure 13:
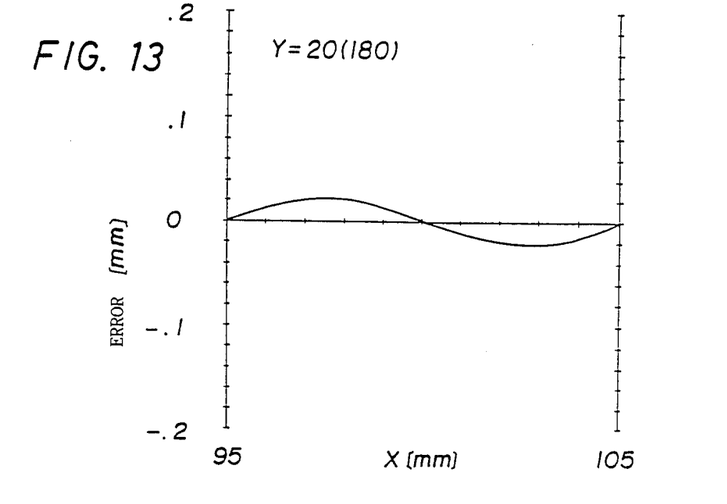
Figure 14:
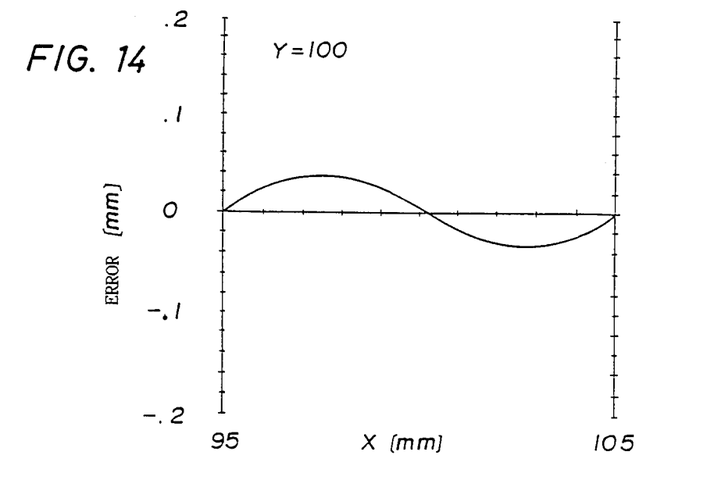
Figure 15:
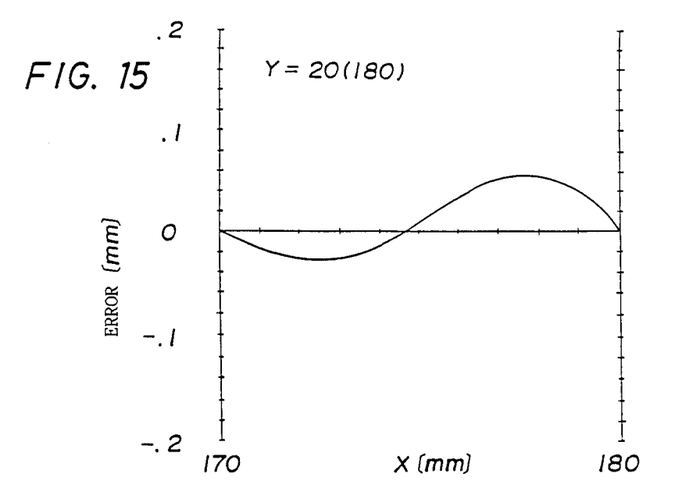
Figure 16:
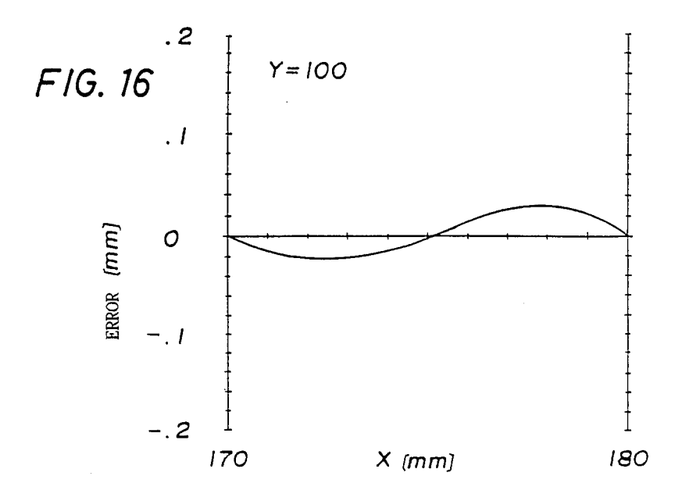

Errors between the measured value and the corrected value are plotted respectively in FIG. 11 at 20 mm$\leq$X$\leq$30 mm, Y=20 mm, about B, B' region adjacent to Y=180 mm; in FIG. 12 at 20 mm$\leq$X$\leq$30 mm, about C region adjacent to Y=100 mm; in FIG. 13 at 95 mm$\leq$X$\leq$105 mm, about D, D' region adjacent to Y=180 mm; in FIG. 14 at 95 mm$\leq$X$\leq$105 mm, about E region adjacent to Y=100 mm; in FIG. 15 at 170 mm$\leq$X$\leq$180 mm, Y=20 mm, about F, F' region adjacent to Y=180 mm; in FIG. 16 at 170 mm$\leq$X$\leq$180 mm about G region adjacent to Y=100 mm.

It is understood from these figures that error of ±0.04 mm or less can be detected at center portion of the input plane 2 and error of ±0.08 mm or less can be detected at peripheral portion.

Effects of the above-mentioned embodiment are as follows:

(1) Coordinates can be detected with error of ±0.08 mm or at most ±0.1 mm or less within region of 20 mm or less from the peripheral portion of the input apparatus having the input plane of 200 mm×200 mm.

(2) Since the pickup level can be made relatively high (Z=15 mm is selected in this embodiment.), display device such as LCD can be installed between the input plane and the detecting member at front end of the pickup and the application field as input apparatus becomes wide.

(3) Since each one loop is driven, individual loop need not be provided with a driver of constant current amplitude, an operation amplifier, a precision resistor or the like, although necessary in the prior art, thereby the coordinate input apparatus can be obtained at low cost.

(4) Since installation of only the switching element and the resistor onto the conductor to form the loop will do, there is little variation of current between the conductors and therefore the adjustment as in the prior art is not required.

(5) No shift register but decoder may be used for selection of each loop, thereby random access of the loop becomes possible and the processing speed can be improved.

(6) The number of circuit parts is decreased, thereby the consumption power can be reduced.

According to the invention in above-mentioned constitution, the compensation loop is installed so as to surround the main loop, each main loop is scanned thereby rough region where the coordinate indicating tool exists can be detected, compensation value stored in the first memory means is referred corresponding to the detected rough region and current value to be transmitted into the compensation loop is adjusted thereby shift of the polarity inversion position of the magnetic field intensity is suppressed to minimum and interpolation value in the rough region is calculated, the correction value stored in the second memory means is drawn from the interpolation value, and the coordinate value of the rough region and the correction value are combined and the coordinate position is detected, thereby accuracy of the coordinate input apparatus is improved and the detection time is reduced and the cost is decreased.

What is claimed is:

1. A coordinate input apparatus wherein scanning signal is transmitted in sequence into a main loop composed of a plurality of conductors embedded in parallel to each other on an input plane, and coordinate position is detected based on signal detected by a coordinate indicating tool which can point on the input plane arbitrarily, said input apparatus comprising:

a compensation loop installed near the common conductor of the main loop and constituted as a separate conductor;

a switching means for selecting each one loop of the main loop in sequence and transmitting the scanning signal;

a coordinate indicating tool for detecting signal produced by the scanning signal transmitted into each loop using the switching means;

a polarity discrimination means for discriminating inversion of polarity of signal detected by the coordinate indicating tool;

a first memory means for previously storing compensation value corresponding to rough coordinate position on the input plane of the coordinate indicating tool;

a control means for detecting the rough coordinate position of the coordinate indicating tool from the scanning position where the polarity conversion is discriminated by the polarity discrimination means and invoking compensation value from the first memory means corresponding to the position thereof and transmitting current corresponding to the compensation value into the compensation loop;

means for calculating interpolation value to interpolate the position pointed by the coordinate indicating tool from signal level before and after the polarity inversion of signal detected by the coordinate indicating tool;

a second memory means for previously storing correction value to correct error between the interpolation value and the point position of the actual coordinate indicating tool and to specify position within the rough region; and an operation means for calculating the point position of the coordinate indicating tool from the coordinate position of the rough region and the correction value.

* * * * *